US012808207B2

(12) United States Patent
Lovett

(10) Patent No.: US 12,808,207 B2

(45) Date of Patent: Nov. 24, 2026

(54) MOULDINGS

(71) Applicant: Steves & Sons, Inc., San Antonio, TX (US)

(72) Inventor: Jonathan Scott Lovett, La Vernia, TX (US)

(73) Assignee: STEVES & SONS, INC., San Antonio, TX (US)

( * ) Notice: Subject to any disclaimer, the term of this patent is extended or adjusted under 35 U.S.C. 154(b) by 162 days.

(21) Appl. No.: 18/606,485

(22) Filed: Mar. 15, 2024

(65) Prior Publication Data

US 2025/0290327 A1 Sep. 18, 2025

(51) Int. Cl.

*E04F 19/02* (2006.01)
*E04F 19/04* (2006.01)
*E06B 1/60* (2006.01)

(52) U.S. Cl.

CPC .......... *E04F 19/02* (2013.01); *E04F 19/0495* (2013.01); *E06B 1/6023* (2013.01)

(58) Field of Classification Search

CPC ....... E04F 19/02; E04F 19/0495; E04F 13/16; E04F 13/18; E04F 2019/0454; E04F 2019/0413; E04F 2019/0431; E04F 2019/0409; E04F 19/0468; E04F 19/0463; E06B 1/06; E06B 1/6023

See application file for complete search history.

(56) References Cited

U.S. PATENT DOCUMENTS 3,338,008 A * 8/1967 Sklar .......................... E06B 1/08 49/504
4,166,346 A * 9/1979 Barr ...................... E06B 1/6069 49/504
5,365,708 A * 11/1994 Winston .................... E06B 1/10 49/504
5,974,745 A * 11/1999 Barr .......................... E06B 1/10 49/504
6,148,883 A * 11/2000 Wilson ................ E04F 19/0495 144/353
8,534,012 B2 * 9/2013 Wood .................. E04F 19/0495 52/211
2009/0013636 A1 * 1/2009 Wilson .................. E06B 1/6023 52/745.15
2009/0064609 A1 * 3/2009 Ouyang ..................... E06B 1/34 52/211
2025/0290327 A1 * 9/2025 Lovett ................. E04F 19/0495

FOREIGN PATENT DOCUMENTS

DE 19741526 A1 * 3/1999 ............... E06B 1/02
FR 2748289 A1 * 11/1997 .......... E04F 19/0495
GB 2239281 A * 6/1991 ............... E06B 1/08

OTHER PUBLICATIONS

English Translation of DE 19741526 (Year: 1999).*

* cited by examiner

*Primary Examiner* — Andrew J Triggs

(74) *Attorney, Agent, or Firm* — Sterne, Kessler, Goldstein & Fox P.L.L.C.

(57) ABSTRACT

This disclosure is directed to a moulding including a locator (e.g., a projection). The locator can assist in positioning the moulding relative to a frame, for example, a door or window frame, during installation of the moulding. Additionally, the moulding can include a recess that can receive a locator (e.g., projection) of an adjacent moulding to allow multiple mouldings to be packaged in a space-saving manner. The moulding can be a brickmould.

14 Claims, 6 Drawing Sheets

300

MOULDINGS

FIELD

This disclosure relates to mouldings for covering a space between a frame, for example, a door frame or a window frame, and a wall, for example, an exterior or interior building wall.

BACKGROUND

Mouldings are trims or casings that cover a space between a frame, for example, a door frame or a window frame, and a wall, for example, an exterior or interior wall of a building. Mouldings for exterior installations are sometimes referred to as brickmoulds. Mouldings can improve a building's aesthetics by creating visually appealing boundaries between the building's wall and the frame. Mouldings can also protect the frame from environmental elements such as rain. And mouldings can act as a structural support and increase the frame's stability.

Sometimes a reveal (i.e., a portion of the frame that is not covered by a moulding when viewed straight on) is desired, and positioning the moulding properly such that the reveal is uniform can be difficult. A nonuniform reveal due to a misaligned moulding can be aesthetically displeasing. Additionally, when no reveal is desired, moulding that does not align with an edge of the frame can cause a door to catch on the moulding or can be an abrasion hazard. However, proper moulding alignment can be difficult or time consuming to achieve.

Mouldings are often packaged together in a bundle. These bundles of mouldings can be large. Due to the size of these bundles, shipping costs can be expensive for mouldings, and the space required to store the bundles of mouldings can be large. Moreover, mouldings can have curved or nonuniform profiles, creating gaps between adjacent mouldings, increasing packaging costs and space requirements.

BRIEF SUMMARY

In some embodiments, a moulding for covering a space between a frame (e.g., a door frame or a window frame) and a wall can include a first side configured to face away from the frame, a second side opposite the first side and configured to face the frame, and a projection extending from the second side. In some embodiments, the projection can be configured to abut a portion of the wall or a portion of the frame. In some embodiments, the moulding can also include a recess in the second side. In some embodiments, the projection can determine an overlap width of the second side of the moulding and the frame. The overlap width can be a distance the moulding extends over the frame, when installed, in a direction toward a central opening defined by the frame.

In some embodiments, a plurality of mouldings can be packaged in a nested configuration. Each of the plurality of mouldings can be configured to cover a space between a frame (e.g., a door frame or a window frame) and a wall. In some embodiments, the plurality of mouldings can include a first moulding including a first projection and a first recess and a second moulding including a second projection and a second recess. In some embodiments, the second projection can be located in the first recess and the first projection can be located in the second recess. In some embodiments, the plurality of mouldings can also include a third moulding comprising a third projection and a third recess. In some embodiments, the plurality of mouldings can also include a fourth moulding comprising a fourth projection and a fourth recess. In some embodiments, the fourth projection can be located in the third recess and the third projection can be located in the fourth recess. In some embodiments, the first, second, third, and fourth projections can determine an overlap width of a side of the first, second, third, and fourth mouldings, respectively, and the frame. The overlap width can be a distance a moulding of the plurality of mouldings extends over the frame, when installed, in a direction toward a central opening defined by the frame.

BRIEF DESCRIPTION OF THE DRAWINGS

The accompanying figures, which are incorporated herein, form part of the specification and illustrate embodiments of this disclosure. Together with the description, the figures further serve to explain the principles of and to enable a person skilled in the relevant arts to make and use the invention.

DETAILED DESCRIPTION

Embodiments of the present invention will now be described in detail with reference to embodiments thereof as illustrated in the accompanying drawings. References to "one embodiment," "an embodiment," "an example embodiment," "some embodiments," "exemplary," etc., indicate that the embodiment described can include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

Unless clearly indicated to the contrary (e.g., "either x or y, but not both x and y") or readily contextually apparent, the term "or" as used herein is inclusive (i.e., "x or y" includes just x, just y, and x and y). Moreover, such phrases are not necessarily referring to the same embodiment.

The term "about" or "substantially" or "approximately" as used herein means the value of a given quantity that can vary based on a particular technology. Based on the particular technology, the term "about" or "substantially" or "approximately" can indicate a value of a given quantity that varies within, for example, 0.1-10% of the value (e.g., ±0.1%, ±1%, ±2%, ±5%, or ±10% of the value).

Numerical values, including endpoints of ranges, can be expressed herein as approximations preceded by the term "about," "substantially," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

The term "invention" or "present invention" as used herein is a non-limiting term and is not intended to refer to any single embodiment of the particular invention but encompasses all possible embodiments as described in the application.

Figure 1A:
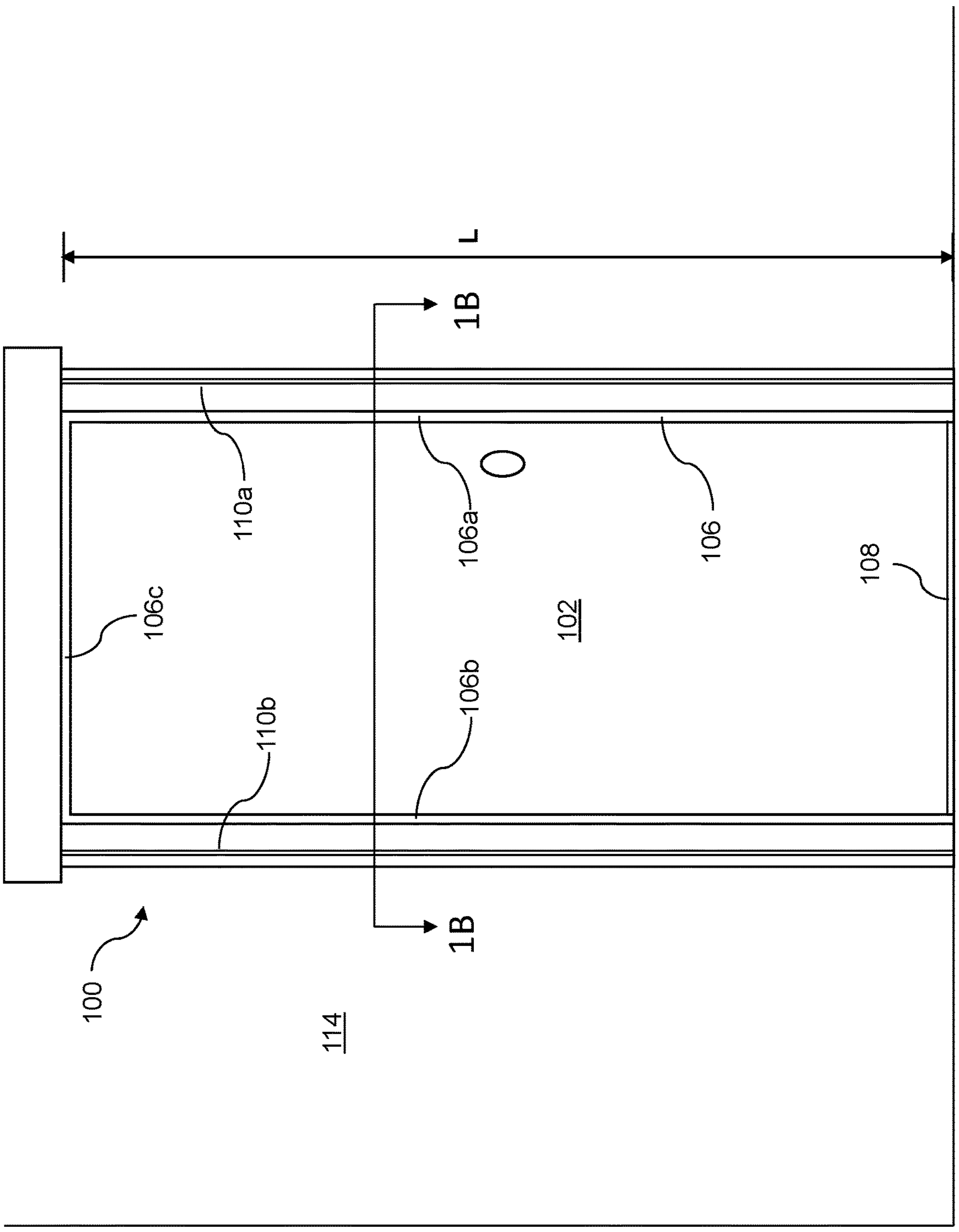
FIG. 1A depicts a front view an exemplary frame assembly including moulding according to some embodiments.

FIGS. 1A-IC respectively show a front view, a top cross-sectional view, and a side view of a frame assembly 100 installed in a wall 114 according to some embodiments. Wall 114 can be, for example, an interior or exterior wall of a building or structure (e.g., house, shed, barn, garage, room, hall, etc.) that includes an opening (e.g., for a doorway or window). The front view can be a view of a user approaching the opening in wall 114 from a direction perpendicular to the plane of wall 114.

In some embodiments, frame assembly 100 can include a door 102 having a first side 104*a* and a second side 104*b*. In some embodiments, for example, if door 102 is an exterior door, the first side 104*a* can be an exterior facing side that faces away from a structure when installed, and the second side 104*b* can be an interior facing side that faces toward an interior of the structure when installed. For a door, which can rotate between a closed and open configuration, "exterior facing" and "interior facing" sides can be identified when the door is in the closed configuration. However, frame assembly 100, whether or not it includes door 102, need not be for an exterior door. For example, it can include a door frame providing passageway between two interior rooms of a building.

In some embodiments, frame assembly 100 can include a frame 106. When installed, door 102 can be affixed to frame 106 and can rotate relative to frame 106. In some embodiments, frame 106 can be made from multiple components for example, two side jambs 106*a* and 106*b*, a head jamb 106*c*, and a sill 108. Sill 108 can provide a platform for a user to step on when entering or exiting through frame 106 and can prevent water and air from entering the structure implementing frame assembly 100.

Figure 1B:
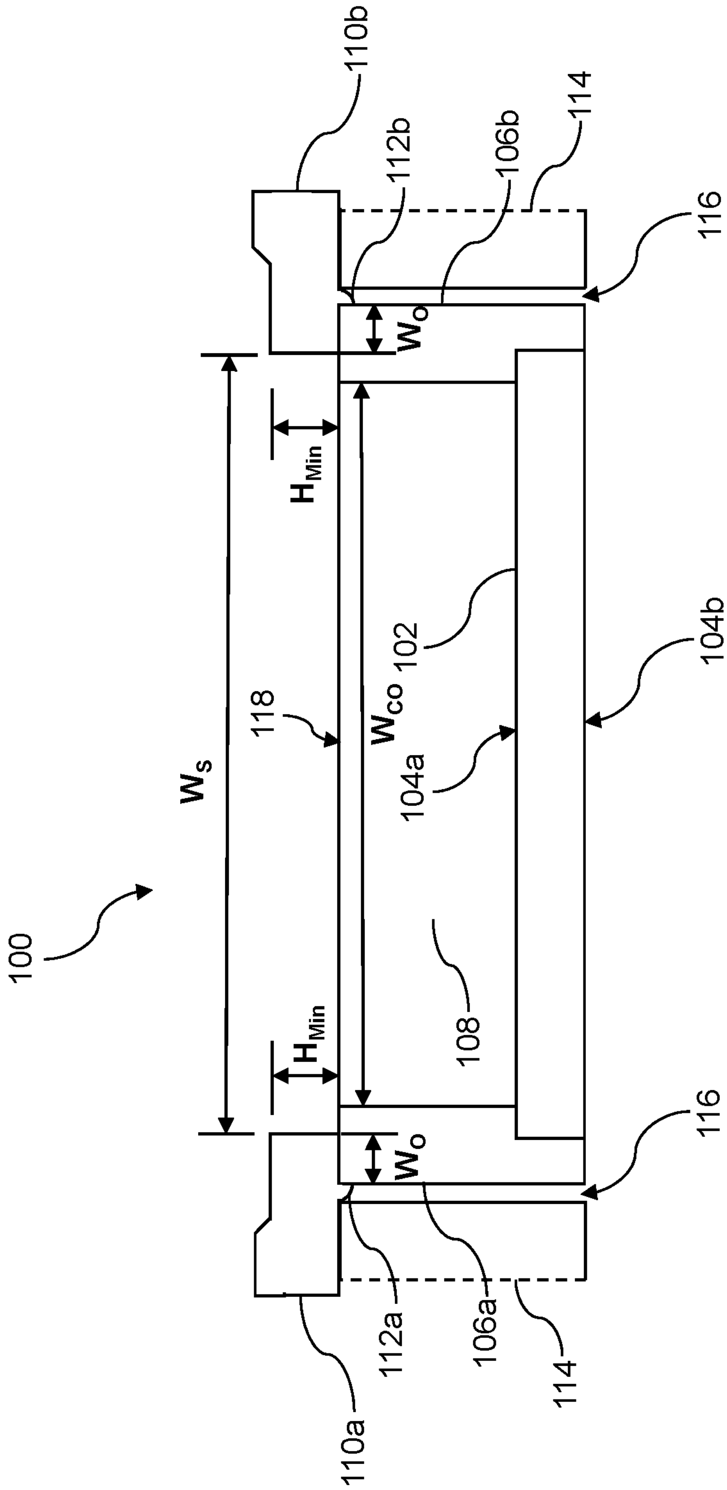
FIG. 1B depicts a top cross-sectional view of the exemplary frame assembly taken along line 1B-1B in FIG. 1A according to some embodiments.

As shown in FIGS. 1A and 1B, frame assembly 100 can include a moulding 110*a* and a moulding 110*b*. As an example, when frame assembly 100 is for an exterior door or window, mouldings 110 can be brickmoulds. When installed, mouldings 110 can each cover a space 116 between frame 106 and wall 114 in which the frame assembly 100 is installed. In some embodiments, mouldings 110*a* and 110*b* can be positioned on opposing sides of frame 106 when installed. Mouldings 110 can be formed of wood, wood composite, vinyl, metal, or any other suitable material.

Moulding 110*a* can include at least one projection 112*a* and moulding 110*b* can include at least one projection 112*b*. Projections 112 can assist in positioning mouldings 110 relative to frame 106. For example, as discussed in more detail with respect to FIG. 2, projections 112 can determine an overlap width $W_O$ of mouldings 110 and frame 106. Projection 112*a* can determine an overlap width $W_O$ of moulding 110*a* and frame 106, and projection 112*b* can determine an overlap width $W_O$ of moulding 110*b* and frame 106. In some embodiments, the overlap widths can be substantially the same. In some embodiments, the overlap widths can differ between mouldings 110*a* and 110*b*. An overlap width can be a distance a moulding (e.g., moulding 110*a*) extends over frame 106 (e.g., side jamb 106*a*), when installed, in a direction toward a central opening 118 defined by frame 106. When moulding 110*a* or moulding 110*b* is installed, projection 112*a* or projection 112*b* can abut frame 106 to prevent moulding 110*a* or moulding 110*b*, respectively, from moving farther toward a central opening 118 defined by frame 106. In this manner, a projection 112 can determine an overlap width. Central opening 118 can be an opening through which a user passes when entering or exiting through door 102.

In addition, projections 112 can determine a separation width $W_S$ between moulding 110*a* and moulding 110*b*. As for the overlap widths, when moulding 110*a* or moulding 110*b* is installed, projection 112*a* or projection 112*b* can abut frame 106 to prevent moulding 110*a* or moulding 110*b*, respectively, from moving farther toward central opening 118, thus determining $W_S$. In some embodiments, $W_S$ can be greater than a width $W_{CO}$ of central opening 118. In some embodiments, $W_S$ can substantially equal $W_{CO}$. In some embodiments, $W_S$ can substantially match the width of a second door, for example, a storm door, installed in frame assembly 100. In such embodiments, the second door can be installed between moulding 110*a* and moulding 110*b*. As shown in FIG. 1B, moulding 110*a* and moulding 110*b* can each have a minimum height $H_{Min}$. In some embodiments, $H_{Min}$ can be the minimum distance a moulding (e.g., moulding 110*a*) extends from frame 106 (e.g., side jamb 106*a*), when installed, in a direction away from a moulding facing side of frame 106 (e.g., a side of frame 106 that abuts portions of a moulding 110 other than a projection 112). In some embodiments, $H_{Min}$ can substantially match a height (e.g., defined along the same axis as $H_{Min}$) of the second door.

FIG. 1B shows that in some embodiments, projections 112 can be positioned between frame 106 and wall 114 when mouldings 110 are installed. For example, in some embodiments, projections 112 can be configured to abut a portion of wall 114 or a portion of frame 106. In some embodiments, projections 112 can be configured to extend in a direction perpendicular to a plane defined by wall 114) of a structure implementing frame assembly 100. For example, for an exterior installation, projection 112 extends in a direction toward the interior of the structure.

The term "abut/abutting" as used herein should not be interpreted to exclude any material from being interposed between two objects (e.g., between projection 112*a* and/or 112*b* and a portion of frame 106). Instead, the term "abut/abutting" can refer to directly abutting (with no materials interposed between) or abutting via an interposed thin material (e.g., adhesive, sealant, building wrap, etc.). In the context of a projection (e.g., a projection 112) abutting a portion of a frame (e.g., frame 106) or a portion of a wall (e.g., wall 114), the general concept intended is that the frame or wall interferes with the free movement of a projection 112 along an axis. The axis can be along a direction toward a central opening (e.g., central opening 118) defined the frame.

Figure 1C:
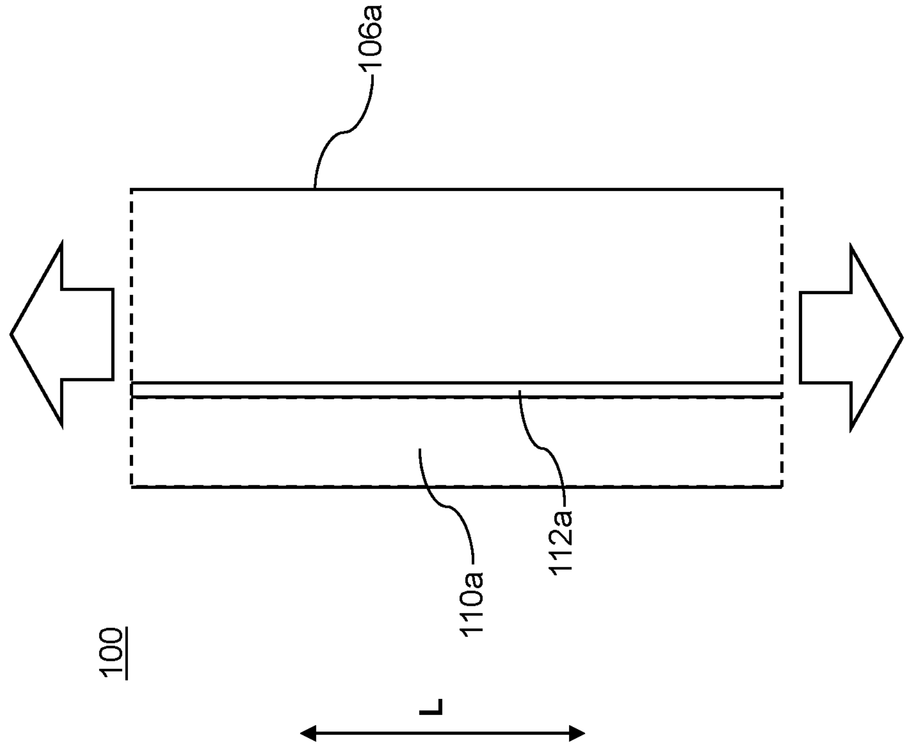
FIG. 1C depicts a side view of a portion of the frame assembly of FIGS. 1A-1B.

As shown in FIG. 1C, projection 112*a* can extend along a length L of moulding 110*a*. In some embodiments, projection 112*a* can extend substantially the full length of moulding 110*a* (for example, as shown in FIG. 1A). In some embodiments, projection 112*a* can extend only partially the length of moulding 110*a*. In some embodiments, projection 112*a* can be continuous. In some embodiments, projection 112*a* can include multiple projections 112*a* each separated by a space along the length of moulding 110*a*. The term "length" of a moulding (e.g., moulding 110*a*) as used herein can refer to the longest dimension of the moulding, which may extend at least the full length of central opening 118 (if the moulding is configured to be installed to a side of door 102) or at least the full width of central opening 118 (if the moulding is configured to be installed above or below door 102).

While FIG. 1C shows moulding 110*a* including projection 112*a*, the disclosure related to FIG. 1C can equally apply to moulding 110*b* including projection 112*b*.

While FIG. 1B shows a top view and FIG. 1C shows a side view of frame assembly 100, the disclosure related to FIGS. 1B and 1C can equally apply if FIG. 1B were a side view of frame assembly 100 and FIG. 1C were a top view (e.g., if moulding 110*a*/jamb 106*a* were positioned at a top of frame 106 and moulding 110*b*/jamb 106*b* were positioned at a bottom of frame 106).

Additionally, while a frame assembly including a door has been discussed with reference to FIGS. 1A-1C, the disclosure related to FIGS. 1A-1C equally applies to a frame assembly including a window or to any other frame defining an opening in a wall of a structure (e.g., a frame not supporting a door or window pane). For example, door 102 can be a window, frame 106 can be a window frame, sill 108 can be a window sill, and central opening 118 can be a window opening such that frame assembly 100 is a window assembly. The disclosure related to FIGS. 1A-IC can equally apply to mouldings 110 used in a window assembly or any other framed opening in a wall.

Figure 2:
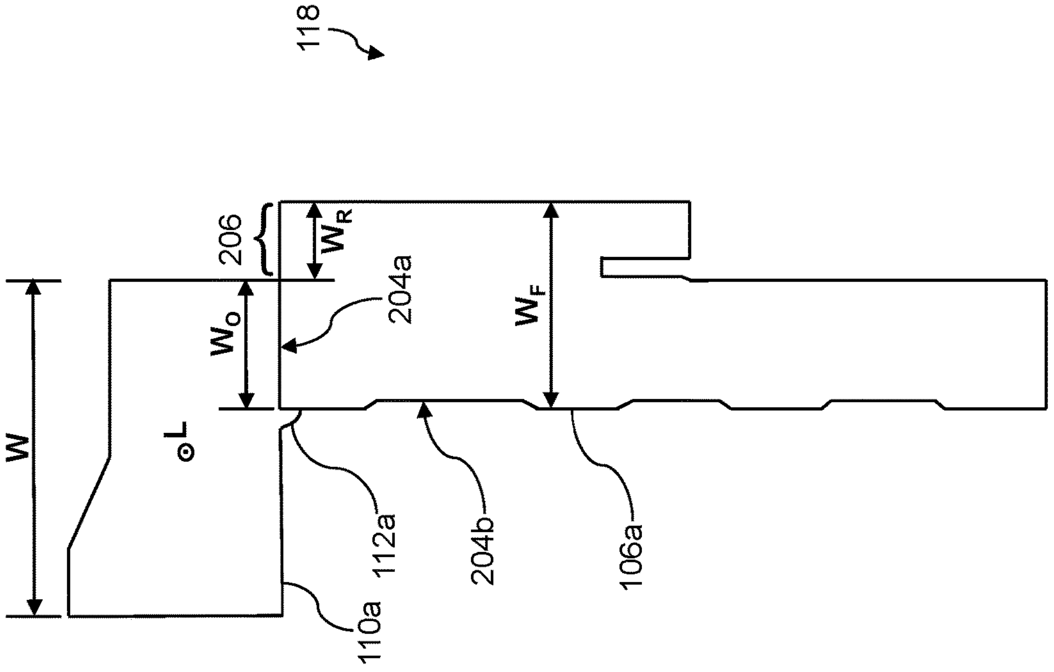
FIG. 2 depicts a top cross-sectional view of a moulding and a frame according to some embodiments.

FIG. 2 shows a top cross-sectional view of moulding 110*a* and a portion of frame 106 (e.g., side jamb 106*a*) according to some embodiments. In FIG. 2, moulding 110*a* has been or is being installed with frame 106 (e.g., side jamb 106*a*). In the embodiments of FIG. 2, moulding 110*a* and frame 106 can be installed in a wall (e.g., wall 114) of a structure or can be separate from the structure (e.g., if moulding 110*a* and frame 106 are assembled and sold together before being installed in a wall). FIG. 2 provides more detail on the structure of moulding 110*a*, including projection 112*a*. For reference purposes, a moulding facing side 204*a* of frame 106 (e.g., a side of frame 106 that abuts portions of a moulding 110 other than a projection 112, as shown in FIG. 2) and an outward facing side 204*b* of frame 106 are shown. The term "outward facing" as used herein can mean facing away from central opening 118, when installed. The term "inward facing" as used herein can mean facing toward central opening 118, when installed.

As shown in FIG. 2, moulding 110*a* can have a width W. The term "width" of a moulding (e.g., moulding 110*a*) as used herein can refer to the dimension of the moulding that extends, when moulding 110*a* is installed, along a wall of a structure in which frame assembly 100 is installed (e.g., wall 114) and perpendicular to a lengthwise axis L of the moulding shown in FIG. 2 (consistent with L of FIG. 1C). In most cases, the width W of a moulding (e.g., moulding 110*a*) is the second longest dimension of the moulding.

As shown in FIG. 2, in some embodiments, the overlap width $W_O$ can be less than a width $W_F$ of frame 106 (as measured in the direction toward the central opening and parallel to $W_O$) such that a portion of moulding facing side 204*a* of frame 106 is not covered by moulding 110*a*. The portion not covered by moulding 110*a* can form a reveal 206. Reveal 206 can have a reveal width $W_R$ (as measured in the direction toward the central opening and parallel to $W_O$ and $W_F$). As with $W_O$ and $W_S$ described with respect FIG. 1B, projection 112*a* can determine $W_R$ by abutting frame 106 and preventing moulding 110*a* from moving farther toward central opening 118.

Accordingly, a projection 112 as disclosed herein can assist in the proper positioning of a moulding 110 with respect to a frame 106. The projection 112 can do so by providing tactile confirmation of proper alignment without the need of measuring. That is, a user installing the moulding 110 with frame 106 can feel when projection 112 abuts frame 106. Accordingly, the user may not be able to move moulding 110 further to an improper position, or may understand that the moulding 110 is not properly aligned because projection 112 has not yet abutted frame 106.

Once a moulding 110 is properly positioned relative to a frame 106, the moulding can be attached to the frame 106 using any suitable attachment mechanism (e.g., nails, screws, and/or adhesive). Normally, positioning the moulding 110 relative to the frame 106 and attaching the moulding 110 to the frame 106 can be a time consuming process. When a moulding 110 is pre-attached to a frame 106 prior to sale, the process required to properly position the moulding 110 relative to the frame 106 can reduce production speed and thus increase production costs. When a moulding 110 is installed after sale (e.g., after installation of a frame 106 in a structure), the process required to properly position the moulding 110 relative to the frame 106 can cause frustration to homeowners, builders, or other workers who are installing the moulding 110 and can cause increased installation time or cost. However, the disclosed mouldings address these difficulties by facilitating efficient and accurate alignment of a moulding and a frame.

In some embodiments, width W can be between about 1 inch and about 5 inches, including subranges. For example, in some embodiments, width W can be between about 1 inch and about 4 inches, between about 1 inch and about 3.5 inches, between about 1 inch and about 3 inches, between about 1.5 and about 2.5 inches, or about 2 inches.

In some embodiments, overlap width $W_O$ can be about 0.3 inches and about 3 inches, including subranges. For example, in some embodiments, $W_O$ can be between about 0.3 and about 2.5 inches, between about 0.3 inches and about 2 inches, between about 0.3 inches and about 1.75 inches, between about 0.3 inches and about 1.5 inches, between about 0.3 inches and about 1.25 inches, between about 0.3 inches and about 1 inch, between about 0.5 inches and about 1 inch, about 0.75 inches, or about 0.5 inches.

In some embodiments, reveal width $W_R$ can be between about 0 inches and about 2.5 inches, including subranges. For example, in some embodiments, $W_R$ can be between about 0 inches and about 2 inches, between about 0 inches and about 1.75 inches, between about 0 inches and about 1.5 inches, between about 0 inches and about 1.25 inches, between about 0 inches and about 1 inch, between about 0 inches and about 0.75 inches, between about 0 inches and about 0.5 inches, between about 0 inches and about 0.25 inches, between about 0.1 inches and about 0.5 inches, or between about 0.1 inches and about 0.25 inches.

In some embodiments, $W_O$ can be between about 0.1 W and about 0.8 W, including subranges. For example, in some embodiments, $W_O$ can be between about 0.1 W and about 0.7 W, between about 0.2 W and about 0.6 W, between about 0.3 W and about 0.5 W, or about 0.4 W.

In some embodiments, $W_O$ can be between about 0.1 $W_F$ and about 1 $W_F$, including subranges. For example, in some embodiments, $W_O$ can be between about 0.2 $W_F$ and about 1 $W_F$, between about 0.3 $W_F$ and about 0.9 $W_F$, between about 0.4 $W_F$ and about 0.8 $W_F$, between about 0.5 $W_F$ and about 0.7 $W_F$, between about 0.1 $W_F$ and about 0.5 $W_F$, between about 0.2 $W_F$ and about 0.5 $W_F$, about 0.6 $W_F$, or about 0.4 $W_F$.

As shown in FIG. 2, $W_O$ added to $W_R$ equals $W_F$. Therefore, the above dimensions also define ratios of $W_R$ to $W_F$.

In some embodiments, $W_R$ can be between about 0 $W_O$ and about 4 $W_O$, including subranges. For example, in some embodiments, $W_R$ can be between about 0 $W_O$ and about 3 $W_O$, between about 0 $W_O$ and about 2 $W_O$, between about 0 $W_O$ and about 1.5 $W_O$, between about 0 $W_O$ and about 1 $W_O$, between about 0 $W_O$ and about 0.75 $W_O$, between about 0.1 $W_O$ and about 0.75 $W_O$, between about 0.2 $W_O$ and about 0.75 $W_O$, between about 0.2 $W_O$ and about 0.5 $W_O$, about 0.6 $W_O$, or about 0.4 $W_O$.

While FIG. 2 shows moulding 110*a* and a portion of frame 106 (e.g., side jamb 106*a*), the disclosure related to FIG. 2 can equally apply to moulding 110*b* and another portion of frame 106 (e.g., side jamb 106*b*).

Figure 3:
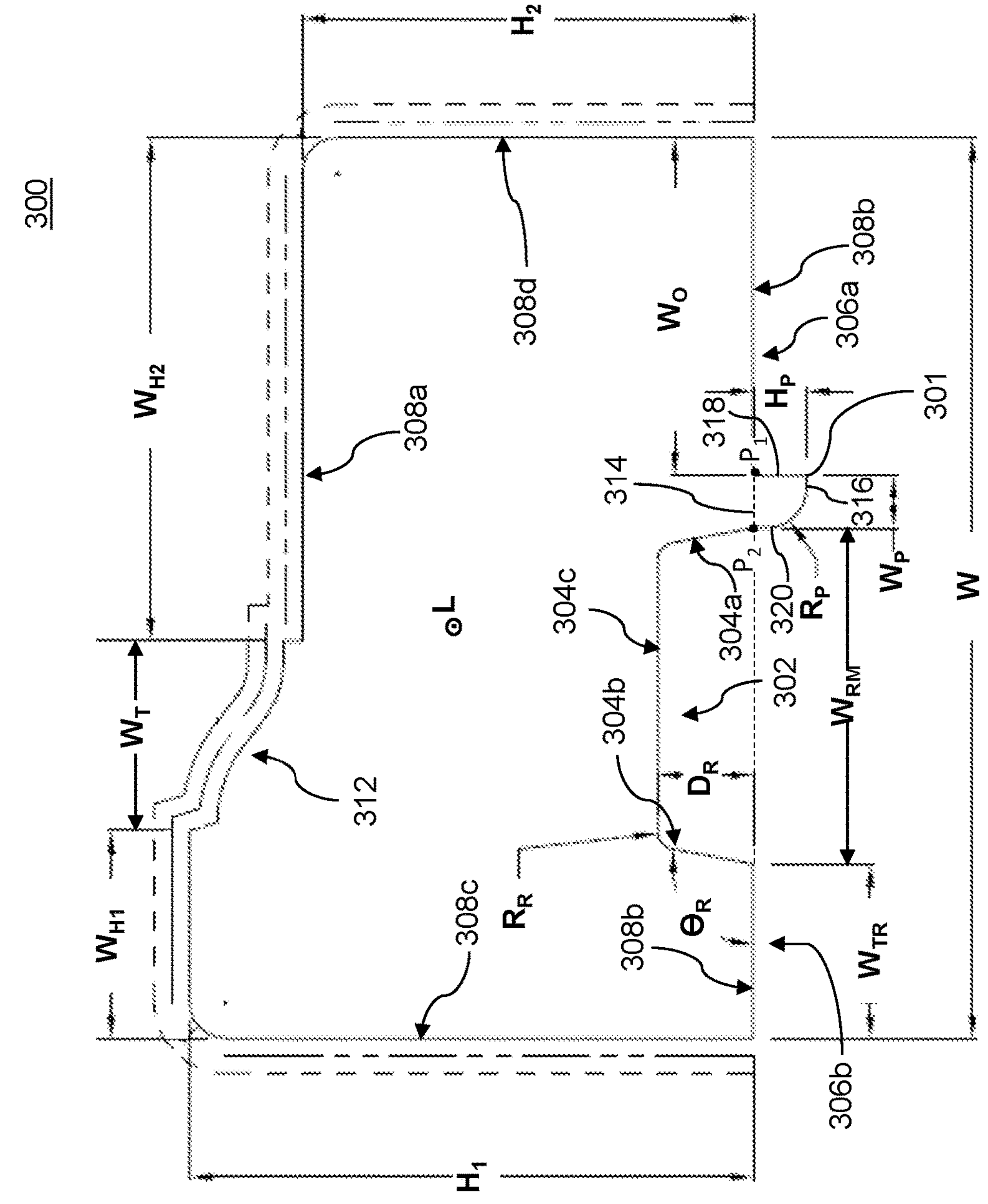
FIG. 3 depicts a top cross-sectional view of a moulding according to some embodiments.

FIG. 3 shows a top cross-sectional view of a moulding 300 according to some embodiments. Moulding 300 can be the same as or substantially similar to mouldings 110*a* and/or 110*b*.

Moulding 300 can include a first side 308*a*, a second side 308*b*, a third side 308*c*, and a fourth side 308*d*. First side 308*a* can be a frame opposing side (e.g., a side configured to face away from moulding facing side 204*a* of frame 106 shown in FIG. 2). Accordingly, first side 308*a* can be configured to face away from a frame (e.g., frame 106). In some embodiments, first side 308*a* can include a profile defining an ornamental design 312. Second side 308*b* can be a frame facing side (e.g., a side configured to abut moulding facing side 204*a* of frame 106 shown in FIG. 2). Accordingly, second side 308*b* can be opposite first side 308*a* and configured to face the frame (e.g., frame 106), as shown in FIG. 1B and FIG. 2 for moulding 110*a*. Third side 308*c* can be an outward facing side. Accordingly, third side 308*c* can be configured to face away from a central opening (e.g., central opening 118) defined by the frame. Fourth side 308*d* can be an inward facing side. Accordingly, fourth side 308*d* can be configured to face toward the central opening (e.g., central opening 118) defined by the frame.

Moulding 300 can include a projection 301 extending from second side 308*b*. Projection 301 can be the same as or similar to projections 112*a* and/or 112*b*. For example, projection 301 can be configured to abut a portion of a wall (e.g., wall 114) or a portion of a frame (e.g., frame 106). In some embodiments, moulding 300 can also include a recess 302 in second side 308*b*. Recess 302 can be configured to receive a projection 301 of another adjacent moulding 300, as described in more detail with respect to FIG. 4. However, moulding 300 need not include a recess 302.

Projection 301 can have a projection height $H_P$. $H_P$ can be a distance projection 301 extends from second side 308*b*, as measured between a base 314 of projection 301 and a tip 316 of projection 301. Base 314 can be located at the intersection points of a plane and projection 301, the plane defined by adjacent planar portions 306*a* of second side 308*b*. In some embodiments, $H_P$ can be between about 0.03 inches and about 2 inches, including subranges. For example, $H_P$ can be between about 0.03 inches and about 1.5 inches, between about 0.03 inches and about 1 inch, between about 0.05 inches and about 1 inch, between about 0.05 inches and about 0.75 inches, between about 0.05 inches and about 0.5 inches, between about 0.05 inches and about 0.3 inches, between about 0.05 inches and about 0.2 inches, or about 0.1 inches.

Projection 301 can also have a projection width $W_P$. $W_P$ can be measured along second side 308*b* and perpendicular to lengthwise axis L (consistent with L of FIG. 1C) of moulding 300. $W_P$ can be a distance between a point $P_1$ where a surface of projection 301 passes the plane used to define base 314 in a direction away from second side 308*b* and a point $P_2$ where the surface of projection 301 returns to the plane used to define base 314. In some embodiments, $W_P$ can be between about 0.03 inches and about 2 inches, including subranges. For example, in some embodiments, $W_P$ can be between about 0.03 inches and about 1.5 inches, between about 0.03 inches and about 1 inch, between about 0.05 inches and about 1 inch, between about 0.05 inches and about 0.75 inches, between about 0.05 inches and about 0.5 inches, between about 0.05 inches and about 0.3 inches, between about 0.05 inches and about 0.2 inches, or about 0.1 inches.

In some embodiments, $H_P$ and $W_P$ can be substantially equal. In some embodiments, $H_P$ and $W_P$ can differ. In some embodiments, $H_P$ can be greater than $W_P$. In some embodiments, $H_P$ can be less than $W_P$.

In some embodiments, $H_P$ can be between about 0.25 $W_P$ and about 4 $W_P$, including subranges. For example, in some embodiments, $H_P$ can be between about 0.3 $W_P$ and about 3 $W_P$, between about 0.4 $W_P$ and about 2.5 $W_P$, between about 0.5 $W_P$ and about 2 $W_P$, between about 0.6 $W_P$ and about 1.5 $W_P$, between about 0.7 $W_P$ and about 1.3 $W_P$, between about 0.8 $W_P$ and about 1.2 $W_P$, or about 1 $W_P$.

As shown in FIG. 3, projection 301 can include a substantially planar side 318 configured to abut a portion of a frame (e.g., frame 106). For example, in some embodiments, substantially planar side 318 can be configured to abut outward facing side 204*b* of frame 106. In some embodiments, substantially planar side 318 can additionally or alternatively be configured to abut a portion of a wall (e.g., wall 114). The term "substantially planar" as used herein can refer to a surface that does not include projections or a curvature that would be readily apparent to an ordinary human observer with the naked eye and that would interfere with the surface fitting flush against an adjacent planar surface.

In some embodiments, projection 301 can include a curved side 320. In some embodiments, curved side 320 can be opposite substantially planar side 318. In some embodiments, curved side 320 can be included without any substantially planar side (e.g., the entirety of projection 301 can be curved). In some embodiments, projection 301 can include no curved side (e.g., can be shaped as a triangle or a rectangle from the view of FIG. 3). In some embodiments, a portion or all of curved side 320 can have a radius of curvature $R_P$. In some embodiments, $R_P$ can be between about 0.05 inches and about 3 inches, including subranges. For example, in some embodiments, $R_P$ can be between about 0.05 inches and about 2.5 inches, between about 0.05 inches and about 2 inches, between about 0.05 inches and about 1.75 inches, between about 0.05 inches and about 1.5 inches, between about 0.05 inches and about 1.25 inches, between about 0.05 inches and about 1 inch, between about 0.05 inches and about 0.75 inches, between about 0.05 inches and about 0.5 inches, between about 0.05 inches and about 0.4 inches, between about 0.05 inches and about 0.3 inches, between about 0.05 inches and about 0.2 inches, or between about 0.05 inches and about 0.15 inches.

In some embodiments, from the view of FIG. 3, projection 301 can be shaped as a quarter circle, a semicircle, or other section of a circle, a full circle (e.g., as if a dowel were affixed to second side 308*b* to form projection 301), a triangle, a rectangle, a trapezoid, or any other suitable shape. In some embodiments, curved side 320 can form part of a circular arc (from the view of FIG. 3).

While exemplary dimensions and shapes for projection 301 have been described, projection 301 can be any shape that would allow it to abut a portion a frame or a portion of a wall to prevent moulding 300 from farther movement relative to the frame and/or wall.

In some embodiments, recess 302 can include a first sidewall 304*a*, a second sidewall 304*b*, and a third sidewall 304*c*. Third sidewall 304*c* can be a floor of recess 302. In some embodiments, recess 302 can be continuously curved such that it includes only a single sidewall. In some embodiments, as shown in FIG. 3, first sidewall 304*a* can transition directly into projection 301. Accordingly, no matter the shape of recess 302, recess 302 can transition directly into projection 301 (i.e., no portion of second side 308*b* lies between recess 302 and projection 301).

As shown in FIG. 3, recess 302 can have a width $W_{RM}$. $W_{RM}$ can be measured along second side 308*b* and perpendicular to lengthwise axis L. $W_P$ can be a distance between the points where recess 302 begins to recede from a plane defined by adjacent planar portions 306*a* and/or 306*b* of second side 308*b*. In some embodiments, $W_{RM}$ can be greater than $W_P$. When a first moulding 300 and a second moulding 300 are positioned adjacent one another, this can allow a projection 301 of the second moulding 300 to be inserted into recess 302 of the first moulding 300 such that at least portions of second sides 308*b* of the first and second mouldings 300 can be flush against one another (e.g., less than 0.1 inches separating them).

In some embodiments, $W_{RM}$ can be between about 0.05 inches and about 2.5 inches, including subranges. For example, in some embodiments, $W_{RM}$ can be between about 0.1 inches and about 2 inches, between about 0.1 inches and about 1.75 inches, between about 0.1 inches and about 1.5 inches, between about 0.1 inches and about 1.25 inches, between about 0.2 inches and about 1 inch, between about 0.3 inches and about 1 inch, between about 0.4 inches and about 1 inch, between about 0.5 inches and about 1 inch, or about 0.75 inches.

In some embodiments, $W_P$ can be between about 0.05 $W_{RM}$ and about 1 $W_{RM}$, including subranges. For example, in some embodiments, $H_P$ can be between about 0.05 $W_{RM}$ and about 0.9 $W_{RM}$, between about 0.05 $W_{RM}$ and about 0.8 $W_{RM}$, between about 0.05 $W_{RM}$ and about 0.7 $W_{RM}$, between about 0.05 $W_{RM}$ and about 0.6 $W_{RM}$, between about 0.05 $W_{RM}$ and about 0.5 $W_{RM}$, between about 0.05 $W_{RM}$ and about 0.4 $W_{RM}$, between about 0.05 $W_{RM}$ and about 0.3 $W_{RM}$, or about 0.15 $W_{RM}$. In some embodiments, $W_{RM}$ being significantly greater than $W_P$ can allow nested mouldings (see FIG. 4) to move relative to one another (e.g., by allowing a projection 301 of an adjacent moulding 300 to move within recess 302) so that projection 301 is less easily damaged.

Recess 302 can have a maximum depth $D_R$. $D_R$ can be the greatest distance between a wall of recess 302 and a plane defined by planar portions 306*a* and/or 306*b* of second side 308*b* adjacent recess 302. In some embodiments, $D_R$ can be greater than $H_P$ (i.e., $H_P$ can be less than $D_R$). When a first moulding 300 and a second moulding 300 are positioned adjacent one another, this can allow a projection 301 of the second moulding 300 to be inserted into recess 302 of the first moulding 300 such that at least portions of second sides 308*b* of the first and second mouldings 300 can be flush against one another (e.g., less than 0.1 inches separating them).

In some embodiments, $D_R$ can be between about 0.05 inches and about 1 inch, including subranges. For example, in some embodiments, $D_R$ can be between about 0.1 inches and about 0.9 inches, between about 0.1 inches and about 0.8 inches, between about 0.1 inches and about 0.7 inches, between about 0.1 inches and about 0.6 inches, between about 0.1 inches and about 0.5 inches, between about 0.1 inches and about 0.4 inches, between about 0.1 inches and about 0.3 inches, or about 0.2 inches.

In some embodiments, $H_P$ can be between about 0.1 $D_R$ and about 1 $D_R$, including subranges. For example, in some embodiments, $H_P$ can be between about 0.2 $D_R$ and about 1 $D_R$, between about 0.3 $D_R$ and about 1 $D_R$, between about 0.4 $D_R$ and about 1 $D_R$, between about 0.5 $D_R$ and about 1 $D_R$, between about 0.6 $D_R$ and about 1 $D_R$, between about 0.7 $D_R$ and about 1 $D_R$, between about 0.8 $D_R$ and about 1 $D_R$, or about 0.9 $D_R$. In some embodiments, $D_R$ being only slightly greater than $H_P$ can increase the structural integrity of moulding 300. For example, moulding 300 can be more resistant to splitting along recess 302 since recess 302 is relatively shallow.

In some embodiments, an angle $\Theta_R$ between a wall of recess 302 (e.g., second sidewall 304*b*) and second side 308*b* can be greater than 90 degrees, including subranges. In some embodiments, ΘR can be equal to or less than 90 degrees, including subranges. $\Theta_R$ can be the angle between two lines defined by a point on second side 308*b*, a point of transition between second side 308*b* and recess 302 (i.e., where recess 302 begins to recede from adjacent portions of second side 308*b*), and a point on a sidewall of recess 302. $\Theta_R$ can be the angle extending through solid portions of moulding 300 rather than through recess 302, as shown in FIG. 3. In some embodiments, $\Theta_R$ can be between about 90 degrees and about 175 degrees, for example, between about 90 degrees and about 160 degrees, between about 90 degrees and about 145 degrees, between about 90 degrees and about 130 degrees, between about 90 degrees and about 115 degrees, or about 100 degrees.

In some embodiments, a wall of recess 302 (e.g., at the transition region between second sidewall 304*b* and third sidewall 304*c*) can include a portion with a radius of curvature RR. In some embodiments, RR can be about 0.01 inches to about 1 inch, including subranges. For example, in some embodiments, RR can be about 0.01 inches to about 0.9 inches, about 0.01 inches to about 0.8 inches, about 0.01 inches to about 0.7 inches, about 0.01 inches to about 0.6 inches, about 0.01 inches to about 0.5 inches, about 0.01 inches to about 0.4 inches, about 0.01 inches to about 0.3 inches, about 0.01 inches to about 0.2 inches, about 0.01 inches to about 0.1 inches, about 0.01 inches to about 0.08 inches, or about 0.04 inches.

In some embodiments, from the view of FIG. 3, recess 302 can shaped as a quarter circle, a semicircle, or other section of a circle, a triangle, a rectangle, a trapezoid, or any other suitable shape. In some embodiments, recess 302 can be shaped substantially like projection 301. In such embodiments, a first moulding 300 and a second moulding 300 can be coupled by inserting, for example, projection 301 of the first moulding into recess 302 of the second moulding. In such embodiments, the first and second mouldings 300 may be prevented from moving relative to one another in a direction along second side 308*b*.

While exemplary dimensions and shapes for recess 302 have been described, recess 302 can be any shape that would allow it to receive a projection 301 of another moulding 300.

In some embodiments, recess 302 can extend along an entire length of moulding 300 (along lengthwise axis L). In some embodiments, recess 302 can extend along only a portion of the length of moulding 300. In some embodiments, recess 302 can be continuous along the length of moulding 300. In some embodiments, recess 302 can include multiple recesses 302 each separated by a space along the length of moulding 300.

In some embodiments, a width $W_{TR}$ from third side 308*c* of moulding 300 to recess 302 can be greater than 0.2 inches, including subranges. This can ensure that portions of moulding 300 bordered by second side 308*b* and third side 308*c* cannot easily break away from moulding 300. In some embodiments, $W_{TR}$ can be greater than 0.25 inches, greater than 0.3 inches, or greater than 0.35 inches.

In some embodiments, second side 308*b* of moulding 300 can include markings, for example, on planar portions 306*a* or another portion of second side 308*b*, to indicate where moulding 300 should overlap a frame 106. This may assist a user in positioning moulding 300 properly relative to the frame 106.

In some embodiments, moulding 300 can have a first height $H_1$ measured along third side 308*c* (which can be an outward facing side) and perpendicular to lengthwise axis L of moulding 300. In some embodiments, moulding 300 can have a second height $H_2$ measured along fourth side 308*d* (which can be an inward facing side) and perpendicular to lengthwise axis L of moulding 300. $H_1$ and $H_2$ (or any height) can be measured for any portion of moulding 300 along the width W of moulding 300 and can be measured neglecting the depth of recess 302 and the height of projection 301 (i.e., height can be measured from the plane(s) defined by planar portions 306*a* and/or planar portions 306*b* to first side 308*a* along a vertical axis according to the perspective of FIG. 3). In embodiments in which third side 308*c* and fourth side 308*d* are substantially parallel, a vertical axis according to the perspective of FIG. 3 can extend parallel to third side 308*c* and fourth side 308*d*. In some embodiments, $H_2$ can be substantially the same as $H_{Min}$ shown in FIG. 1B.

In some embodiments, moulding 300 can include a varying height (neglecting recess 302 and projection 301) along its width W. In some embodiments, moulding 300 can include a substantially constant height (neglecting recess 302 and projection 301) along its width W. In some embodiments, $H_1$ can be greater than $H_2$. In some embodiments, $H_1$ can be less than $H_2$. In some embodiments, $H_1$ can be substantially equal to $H_2$.

In some embodiments, $H_1$ can be between about 0.5 inches and about 3 inches, including subranges. For example, in some embodiments, $H_1$ can be between about 0.5 inches and about 2.5 inches, between about 0.5 inches and about 2 inches, between about 0.5 inches and about 1.75 inches, between about 0.75 inches and about 1.75 inches, between about 1 inch and about 1.5 inches, or about 1.25 inches.

In some embodiments, $H_2$ can be between about 0.4 inches and about 2.5 inches, including subranges. For example, in some embodiments, $H_1$ can be between about 0.4 inches and about 2 inches, between about 0.4 inches and about 1.75 inches, between about 0.4 inches and about 1.5 inches, between about 0.5 inches and about 1.25 inches, between about 0.75 inches and about 1.25 inches, or about 1 inch.

In some embodiments, $H_2$ can be between about $0.5H_1$ and about $1H_1$, including subranges. For example, in some embodiments, $H_2$ can be between about $0.5H_1$ and about $0.9H_1$, between about $0.6H_1$ and about $1H_1$, between about $0.7H_1$ and about $0.9H_1$, or about $0.8H_1$.

As shown in FIG. 3, first side 308*a* can include a profile defining an ornamental design 312. The term "ornamental design" as used herein can mean variation(s) from a plain surface (e.g., a surface not designed to include variations in depth or color), the variation(s) configured to be visible when moulding 300 is installed. In some embodiments, ornamental design 312 can include or define at least a portion of a transition between $H_1$ and $H_2$ of moulding 300 (neglecting the depth of recess 302 and the height of projection 301 in the measurement of $H_1$ and $H_2$). In some embodiments, portions of moulding 300 having greater than a minimum height (e.g., $H_2$) of moulding 300 can overlap recess 302 along the width W of moulding 300 (e.g., share a vertical axis according to the perspective of FIG. 3). As noted above, such portions are determined neglecting the depth of recess 302 and the height of projection 301 in the measurement of the height of moulding 300 at a given point. In embodiments in which $H_1$ is greater than $H_2$, such portions can include portions of moulding 300 that have first height $H_1$ and/or portions of moulding 300 that have a height between $H_1$ and $H_2$. Portions of greater than minimum height overlapping recess 302 along the width of moulding 300 can increase the structural integrity of moulding 300. For example, moulding 300 can be more resistant to splitting along recess 302 since moulding 300 can be relatively thick at recess 302.

Accordingly, in some embodiments in which $H_1$ is greater than $H_2$, a width $W_{H1}$ of portions of moulding 300 that have first height $H_1$ can be greater than the width $W_{TR}$ from third side 308*c* to recess 302. Additionally or alternatively, in some embodiments in which $H_1$ is greater than $H_2$, $W_{H1}$ and a width $W_T$ of portions of moulding 300 that have a height transitioning between $H_1$ and $H_2$, when combined, can be greater than $W_{TR}$.

Similarly, in some embodiments, portions of moulding 300 having a minimum height (e.g., $H_2$) of moulding 300 can overlap recess 302 for less than a full width $W_{RM}$ of recess 302, or not at all, along the width W of moulding 300. For example, in some embodiments in which $H_1$ is greater than $H_2$, a width $W_{H2}$ of portions of moulding 300 that have second height $H_2$ can be less than the width $W_{RM}$ of recess 302, the width $W_P$ of projection 301, and the overlap width $W_O$ combined. In some embodiments in which $H_1$ is greater than $H_2$, $W_{H2}$ can be less than $W_P$ and $W_O$ combined, or just less than $W_O$. Similarly to the above features, these features can increase the structural integrity of moulding 300. For example, moulding 300 can be more resistant to splitting along recess 302 since moulding 300 can be relatively thick at recess 302.

While exemplary dimensions and shapes for moulding 300 have been described, a moulding of any size or shape that includes a projection (e.g., projection 301) and/or a recess (e.g., recess 302) can be implemented with the remaining components of this disclosure. For example, moulding 300 need not include substantial variations in height and/or need not include a profile defining an ornamental design.

While FIG. 3 shows moulding 300 that can be the same as or substantially similar to moulding 110*a*, the disclosure related to FIG. 3 can equally apply to a moulding that is the same as or substantially similar to moulding 110*b*.

Figure 4:
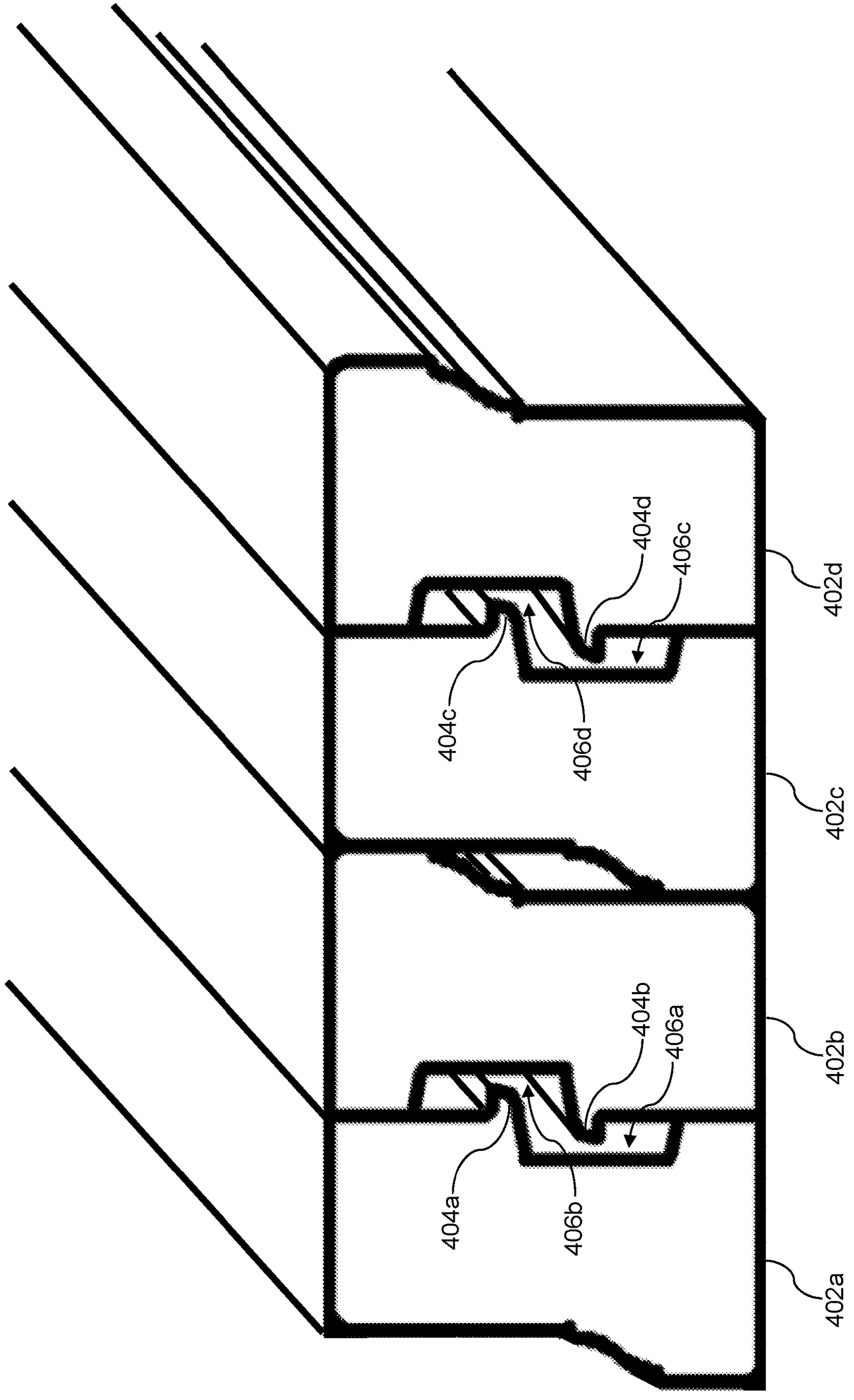
FIG. 4 depicts a plurality of mouldings in a nested configuration according to some embodiments.

FIG. 4 shows a plurality of mouldings 402 according to some embodiments. Each of mouldings 402 can be the same as or substantially similar to mouldings 110*a*, 110*b*, and/or 300. Likewise, in some embodiments, each of mouldings 402 can be the same or substantially similar to one another. Mouldings 402 can be packaged in a nested configuration. Each of mouldings 402 can be configured to cover a space between a frame (e.g., frame 106) and a wall (e.g., wall 114).

In some embodiments, the plurality of nested mouldings 402 can include a first moulding 402*a* including a first projection 404*a* and a first recess 406*a*. Mouldings 402 can also include a second moulding 402*b* including a second projection 404*b* and a second recess 406*b*. In some embodiments, when mouldings 402 are packaged in a nested configuration, second projection 404*b* can be located in first recess 406*a* and first projection 404*a* can be located in second recess 406*b*. In some embodiments, mouldings 402 can also include a third moulding 402*c* including a third projection 404*c* and a third recess 406*c*. In some embodiments, mouldings 402 can also include a fourth moulding 402*d* including a fourth projection 404*d* and a fourth recess 406*d*. In some embodiments, when mouldings 402 are packaged in a nested configuration, fourth projection 404*d* can be located in third recess 406*c* and third projection 404*c* can be located in fourth recess 406*d*.

In some embodiments, as shown in FIG. 4, the side of second moulding 402*b* that is configured to face away from the frame when installed is adjacent to the side of third moulding 402*c* that is configured to face away from the frame when installed.

In some embodiments, the plurality of nested mouldings 402 include more than four mouldings. In such embodiments, the next moulding 402 adjacent fourth moulding 402*d* would be positioned such the side of that moulding 402 that is configured to face away from the frame when installed is adjacent to the side of fourth moulding 402*d* that is configured to face away from the frame when installed. This pattern can be repeated until the desired number of mouldings 402 is achieved.

In some embodiments, the plurality of nested mouldings 402 include less than four mouldings, for example, two or three mouldings.

In some embodiments, the plurality of nested mouldings 402 are bound together with strapping. In some embodiments, the plurality of nested mouldings are 402 are bound together using plastic wrap, for example, stretch wrap.

In some embodiments, mouldings 402 packaged and sold together (e.g., to a hardware supplier or to a contractor) can include multiple mouldings 402 that will later be cut to fit the dimensions of a frame 106, but may be purchased individually or together by a customer of the hardware supplier. In some embodiments, mouldings 402 packaged and sold together (e.g., to a customer) can include mouldings 402 that are pre-cut to match the dimensions of a frame 106 of a particular size. In such embodiments, the mouldings 402 packaged and sold together can include a moulding 402 configured to be installed above a door or window (e.g., at the top of a frame 106) and two mouldings 402 configured to be installed on opposing lateral sides of the door or window (e.g., at the sides of the frame 106. In some cases, four mouldings 402 can be packaged together, the four mouldings 402 additionally including a moulding 402 configured to be installed below the door or window (e.g., at the bottom of the frame 106), though this moulding 402 may be omitted. However, mouldings 402 need not be pre-cut mouldings.

Regardless, it can be advantageous to package and sell mouldings together to ensure that adequate lengths of moulding are available to a customer. However, when mouldings are packaged together, protruding features of the mouldings often increase the amount of packaging required by increasing the amount of space a number of adjacent mouldings occupy. The protruding features of the mouldings can abut adjacent mouldings and create gaps between the adjacent mouldings, increasing packaging costs.

However, mouldings 402 shown in FIG. 4 can be configured to nest with each other when packaged. Protruding features of mouldings 402 (e.g., projections 404), rather than creating gaps between adjacent mouldings 402, can be received by recesses 406 to save space in a package of mouldings 402. Accordingly, the benefit of projections 404 (e.g., case of positioning mouldings 402 relative to a frame 106) can be obtained without increasing packaging size and/or costs.

While FIG. 4 shows four mouldings 402, any number of mouldings 402 can be packaged in a nested configuration, for example, two, three, five, six, seven, eight, nine, ten, or more mouldings 402. In some embodiments, an even number of mouldings 402 can be packaged in a nested configuration. In some embodiments, an odd number of mouldings 402 can be packaged in a nested configuration.

First, second, third, and fourth projections 404*a-d* can each be the same as or substantially similar to projections 112*a*, 112*b*, and/or 301. For example, first, second, third, and fourth projections 404*a-d* can determine an overlap width (e.g., $W_O$) of a side of the first, second, third, and fourth mouldings 402*a-d*, respectively, and a frame (e.g., frame 106), as discussed above with respect to FIGS. 1B and 2. As above, the overlap width can be a distance a moulding 402 extends over the frame, when installed, in a direction toward a central opening (e.g., central opening 118) defined by the frame. The overlap width can have any or all of the features of $W_O$ described above.

First, second, third, and fourth recesses 406*a-d* can each be the same as or substantially similar to recess 302.

Mouldings according to some embodiments can include a locator (e.g., a projection) that can assist in positioning the moulding relative to a frame by providing tactile confirmation of location. This can reduce production and/or installation costs and improve aesthetic appearances of a resulting frame assembly. Mouldings according to some embodiments can fit snugly together in a nested configuration when packaged, saving space and packaging costs.

The foregoing description of the specific embodiments described with reference to the figures will so fully reveal the general nature of the disclosure that others can, by applying knowledge within the skill of the art, readily modify or adapt for various applications such specific embodiments, without undue experimentation, without departing from the general concept of this disclosure.

While various embodiments of this disclosure have been described above, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of this disclosure. The elements of the embodiments presented above are not necessarily mutually exclusive, but can be interchanged to meet various needs as would be appreciated by one of skill in the art.

It is to be understood that the phraseology or terminology used herein is for the purpose of description and not of limitation. The breadth and scope of this disclosure should not be limited by any of the above-described exemplary embodiments but should be defined only in accordance with the following claims and their equivalents.

It is to be appreciated that the Detailed Description section, and not the Summary and Abstract sections, is intended to be used to interpret the claims. The Summary and Abstract sections can set forth one or more but not all exemplary embodiments of the present invention as contemplated by the inventor(s), and thus, are not intended to limit the present invention and the appended claims in any way.

What is claimed is:

1. A moulding for covering a space between a frame and a wall, comprising:

a first side configured to face away from the frame;

a second side opposite the first side and configured to face the frame;

a projection extending from the second side, the projection being configured to extend into the space between the frame and the wall, and to abut a portion of the wall or a portion of the frame; and a recess in the second side, wherein a distance the projection extends from the second side is less than a maximum depth of the recess such that the projection can be fully received in a substantially identical recess of a substantially identical moulding.

2. The moulding of claim 1, comprising an inward facing side configured to face toward a central opening defined by the frame, and wherein the projection is offset from the inward facing side by an overlap width, the overlap width determining, when installed, a non-zero distance the moulding extends over the frame in a direction toward the central opening.

3. The moulding of claim 2, wherein the overlap width is between 0.5 inches and 1 inch.

4. The moulding of claim 2, wherein the overlap width is less than a width of the frame in the direction toward the central opening such that a portion of a side of the frame facing the second side is not covered by the moulding.

5. The moulding of claim 2, wherein the second side of the moulding is substantially planar across the distance the moulding extends over the frame in the direction toward the central opening when installed.

6. The moulding of claim 1, wherein a distance the projection extends from the second side is between 0.05 inches and 0.5 inches.

7. The moulding of claim 1, wherein a width of the projection as measured along the second side and perpendicular to a lengthwise axis of the moulding is between 0.05 inches and 0.3 inches.

8. The moulding of claim 1, the projection comprising a substantially planar side configured to abut the portion of the wall or the portion of the frame.

9. The moulding of claim 8, the projection comprising a curved side opposite the substantially planar side.

10. The moulding of claim 1, wherein a wall of the recess transitions directly into the projection.

11. The moulding of claim 1, comprising a first height measured along an outward facing side of the moulding and perpendicular to a lengthwise axis of the moulding and a second height measured along an inward facing side of the moulding and perpendicular to the lengthwise axis of the moulding, the first height being greater than the second height.

12. The moulding of claim 1, wherein an angle between a wall of the recess and the second side is greater than 90 degrees.

13. The moulding of claim 1, wherein the first side comprising a profile defining an ornamental design.

14. The moulding of claim 1, wherein the recess is adjacent the projection.

* * * * *